United States Patent
Wang et al.

(10) Patent No.: US 11,807,582 B1
(45) Date of Patent: Nov. 7, 2023

(54) SILICON NITRIDE CERAMIC SINTERED BODY AND PREPARATION METHOD THEREOF

(71) Applicants: Lanzhou Institute of Chemical Physics, CAS, Lanzhou (CN); Yantai Zhongke Research Institute of Advanced Materials and Green Chemical Engineering, Yantai (CN); Shandong Laboratory of Yantai Advanced Materials and Green Manufacturing, Yantai (CN)

(72) Inventors: Lujie Wang, Lanzhou (CN); Zhuhui Qiao, Lanzhou (CN); Tongyang Li, Lanzhou (CN); Ziyue Wang, Lanzhou (CN); Yuan Yu, Lanzhou (CN); Huaguo Tang, Lanzhou (CN)

(73) Assignees: Lanzhou Institute of Chemical Physics, CAS, Lanzhou (CN); Yantai Zhongke Research Institute of Advanced Materials and Green Chemical Engineering, Yantai (CN); Shandong Laboratory of Yantai Advanced Materials and Green Manufacturing, Yantai (CN)

(*) Notice: Subject to any disclaimer, the term of this patent is extended or adjusted under 35 U.S.C. 154(b) by 0 days.

(21) Appl. No.: 18/348,425

(22) Filed: Jul. 7, 2023

(30) Foreign Application Priority Data

Jul. 22, 2022 (CN) .......................... 202210865969.X

(51) Int. Cl.
*C04B 35/584* (2006.01)
*C04B 35/587* (2006.01)
*C04B 41/00* (2006.01)
*C04B 35/626* (2006.01)

(52) U.S. Cl.
CPC ........ *C04B 35/584* (2013.01); *C04B 35/6264* (2013.01); *C04B 41/0054* (2013.01); *C04B 41/0072* (2013.01); *C04B 2235/3203* (2013.01); *C04B 2235/5436* (2013.01); *C04B 2235/5445* (2013.01); *C04B 2235/666* (2013.01)

(58) Field of Classification Search
CPC ... C04B 35/584; C04B 35/587; C04B 35/589; C04B 35/591; C04B 35/593; C04B 35/5935

See application file for complete search history.

(56) References Cited

FOREIGN PATENT DOCUMENTS

| CN | 103922749 A | 7/2014 |
| JP | 1993139840 A | 6/1993 |
| JP | 3034100 B2 * | 4/2000 |

OTHER PUBLICATIONS

Chinese Office Action for Chinese Patent App. No. 202210865969.X, dated Jan. 4, 2023.

* cited by examiner

*Primary Examiner* — Karl E Group
(74) *Attorney, Agent, or Firm* — Gottlieb, Rackman & Reisman, PC

(57) ABSTRACT

Disclosed are a silicon nitride ceramic sintered body and a preparation method thereof. The silicon nitride ceramic sintered body has a content of a silicon nitride crystalline phase of not less than 98 wt %, a relative density of not less than 99%, a porosity of not larger than 1%, a grain boundary phase including Li, O, N, and Si elements, and a total content of C, F, Al, Mg, K, Ca, Na and rare-earth metals elements of less than 0.1 wt %.

15 Claims, No Drawings

SILICON NITRIDE CERAMIC SINTERED BODY AND PREPARATION METHOD THEREOF

CROSS REFERENCE TO RELATED APPLICATION

This patent application claims the benefit and priority of Chinese Patent Application No. 202210865969.X filed with the China National Intellectual Property Administration on Jul. 22, 2022, the disclosure of which is incorporated by reference herein in its entirety as part of the present application.

TECHNICAL FIELD

The present disclosure belongs to the technical field of ceramic materials, and in particular relates to a silicon nitride ceramic sintered body and a preparation method thereof.

BACKGROUND

Silicon nitride ceramics have attracted wide attention due to excellent high-temperature properties, chemical stability, and mechanical properties. Moreover, with the development in the fields such as aerospace and industry engineering, there have been increasing demands for the properties of silicon nitride ceramics In the conventional molding methods of silicon nitride ceramics, a powder or a slurry containing a powder is molded, then subjected to sintering and other post-treatment to obtain a ceramic component, and then the ceramic component is subjected to micro-machining to obtain a desired ceramic. Due to a crystal phase transformation from a phase to β phase occurring in the sintering process of silicon nitride, there must be the breakage and generation of Si—N chemical bonds. Si—N is a high-energy covalent bond. Higher energy is required during the breakage and generation of bonds, resulting in a lower atomic diffusion coefficient in the sintering process and making sintering difficult. Therefore, a sintering aid needs to be added during the sintering of silicon nitride to enhance the sintering properties of silicon nitride ceramics.

Conventional sintering aids used for silicon nitride ceramic sintered body comprise metallic oxides and rare earth oxides, specifically, $Al_2O_3$, $MgO$, $ZrO_2$, $SiO_2$, and rare earth oxides. The sintering aid generally accounts for 3-15 wt % of powder raw materials. In the final silicon nitride ceramic sintered body, the sintering aid will exist therein in the form of an intergranular glass phase of silicon nitride. However, the high content of sintering aids causes unfavorable effects on the purity, high-temperature mechanical properties, and heat-conducting properties of the silicon nitride ceramic sintered body.

SUMMARY

An object of the present disclosure is to provide a silicon nitride ceramic sintered body and a preparation method thereof. In the present disclosure, the silicon nitride ceramic sintered body has the characteristics of high purity and high densification at the same time, and excellent high-temperature mechanical properties.

To achieve the above object, the present disclosure provides the following technical solutions:

The present disclosure provides a silicon nitride ceramic sintered body, the silicon nitride ceramic sintered body having a content of a silicon nitride crystalline phase of not less than 98 wt %, a relative density of not less than 99%, a porosity of not larger than 1%, a grain boundary phase comprising Li, 0, N, and Si elements, and a total content of C, F, Al, Mg, K, Ca, Na and rare-earth metals elements of less than 0.1 wt %.

In some embodiments, the silicon nitride ceramic sintered body has a total content of Li, 0, N, and Si elements of 99.7-100 wt %.

In some embodiments, the silicon nitride ceramic sintered body has a content of Li element of 0.15-0.6 wt %.

In some embodiments, the silicon nitride ceramic sintered body has a content of 0 element of less than 2 wt %.

In some embodiments, the silicon nitride crystalline phase in the silicon nitride ceramic sintered body has a particle size of 0.3-20 μm.

The present disclosure further provides a method for preparing the silicon nitride ceramic sintered body described in the above technical solutions, comprising:

mixing a silicon nitride powder with a lithium oxide source to obtain a mixture; and placing the mixture into a mold and sintering under a protective gas atmosphere to obtain the silicon nitride ceramic sintered body, where the lithium oxide source comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$.

In some embodiments, a content of Li element in the lithium oxide source accounts for 0.15-0.7 wt % of a content of the mixture.

In some embodiments, the sintering is performed by hot-pressed sintering or spark plasma sintering; and the sintering is performed at a temperature of 1,350-1,800° C. and a pressure of 10-80 MPa for 0.5-5 h.

In some embodiments, the silicon nitride powder has a particle size of 0.01-20 μm, a content of O element of not larger than 1.6 wt %, and a content of metallic impurities of not larger than 0.2 wt %.

In some embodiments, the mixing is performed by wet-ball milling mixing; a ball mill medium of the wet-ball milling mixing comprises one selected from the group consisting of ethanol and water; a ratio of a total mass of the silicon nitride powder and the lithium oxide source to a mass of the ball mill medium is 1:1; a ratio of the total mass of the silicon nitride powder and the lithium oxide source to a mass of a mill ball is in a range of 1:(2-3); and the wet-ball milling mixing is performed at a rotational speed of 150-300 rpm for 2-10 h.

The present disclosure provides a silicon nitride ceramic sintered body, which has a content of a silicon nitride crystalline phase of not less than 98 wt %, a relative density of not less than 99%, a porosity of not larger than 1%, a grain boundary phase comprising Li, O, N, and Si elements, and a total content of C, F, Al, Mg, K, Ca, Na and rare-earth metals elements of less than 0.1 wt %. In the present disclosure, the silicon nitride ceramic sintered body has a grain boundary phase comprising Li, O, N, and Si elements, densely arranged silicon nitride grains, the characteristics of high purity and high densification at the same time, and excellent high-temperature mechanical properties.

The present disclosure provides a method for preparing a silicon nitride ceramic sintered body described in the above technical solutions, comprising: mixing a silicon nitride powder with a lithium oxide source to obtain a mixture, and placing the mixture into a mold and sintering under a protective gas atmosphere to obtain the silicon nitride ceramic sintered body, wherein the lithium oxide source comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$. In the method provided by the present disclosure, the lithium oxide source is used as a sintering aid and comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$. The lithium oxide source is a substance that forms lithium oxide and does not produce other solid impurities when being sintered under a protective gas atmosphere. Active element Li in the lithium oxide source is utilized to assist the breakage and generation of the Si—N chemical bond during the sintering of the silicon nitride powder, which increases the atomic diffusion coefficient in the silicon nitride powder during the sintering process, accelerates the transformation of silicon nitride from α phase to β phase, enhances the sintering properties of the silicon nitride powder, and accelerates the growth of β phase of silicon nitride grains. Moreover, on the one hand, the method could result in the silicon nitride ceramic sintered body; on the other hand, since a small amount of lithium oxide source is used, the silicon nitride grains in the sintered body have a lower content of grain boundary phase, and accordingly, the obtained silicon nitride ceramic has the characteristics of high purity and high densification at the same time, and excellent high-temperature mechanical properties.

DETAILED DESCRIPTION OF THE EMBODIMENTS

The present disclosure provides a silicon nitride ceramic sintered body, which has a content of a silicon nitride crystalline phase of not less than 98 wt %, a relative density of not less than 99%, a porosity of not larger than 1%, a grain boundary phase comprising Li, O, N, and Si elements, and a total content of C, F, Al, Mg, K, Ca, Na and rare-earth metals elements of less than 0.1 wt %.

In some embodiments of the present disclosure, the silicon nitride ceramic sintered body has a content of Li element of 0.15-0.6 wt %, preferably 0.2-0.55 wt %.

In some embodiments of the present disclosure, the silicon nitride ceramic sintered body has a content of O element of less than 2 wt %.

In some embodiments of the present disclosure, the silicon nitride ceramic sintered body has a total content of Li, O, N, and Si elements of 99.7-100 wt %.

In some embodiments of the present disclosure, the silicon nitride crystalline phase in the silicon nitride ceramic sintered body has an average particle size of 0.3-20 μm.

The present disclosure provides a method for preparing the silicon nitride ceramic sintered body described in the above technical solutions, comprising:
mixing a silicon nitride powder with a lithium oxide source to obtain a mixture; and
placing the mixture into a mold and sintering under a protective gas atmosphere to obtain the silicon nitride ceramic sintered body,
where the lithium oxide source comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$.

In the present disclosure, unless otherwise specified, all the preparation raw materials/components are commercially available products well known to those skilled in the art.

In the present disclosure, a silicon nitride powder is mixed with a lithium oxide source to obtain a mixture; and the lithium oxide source comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$.

In some embodiments of the present disclosure, the silicon nitride powder has a particle size of 0.01-20 μm, preferably 0.05-15 μm, and more preferably 1-10 μm.

In some embodiments of the present disclosure, the silicon nitride powder has a content of O element of not larger than 1.6 wt %, preferably not larger than 1.5 wt %.

In some embodiments of the present disclosure, the silicon nitride powder has a content of metallic impurities of not larger than 0.2 wt %, preferably not larger than 0.15 wt %.

In some embodiments of the present disclosure, the lithium oxide source comprises any one selected from the group consisting of $Li_2O$, $Li_2CO_3$, $CH_3COOLi$, $Li_2C_2O_4$, $LiOCH(CH_3)_2$ and $C_2H_5OLi$.

In the present disclosure, the lithium oxide source is a substance that forms lithium oxide and does not produce other solid impurities when being sintered under a protective gas atmosphere.

In some embodiments of the present disclosure, a content of Li element in the lithium oxide source accounts for 0.15-0.7 wt % of a content of the mixture, preferably 0.15-0.6 wt %.

In the present disclosure, when the content of Li element in the lithium oxide source accounts for 0.15-0.7 wt % of the content of the mixture, the auxiliary effect on the sintering of silicon nitride may be achieved and a silicon nitride ceramic sintered body with high purity and high densification may be obtained.

In some embodiments of the present disclosure, the mixing is performed by wet-ball milling mixing.

In some embodiments of the present disclosure, a ball mill medium of the wet-ball milling mixing is selected from the group consisting of ethanol and water, preferably ethanol or water.

In some embodiments of the present disclosure, the ball mill medium is absolute ethanol.

In some embodiments of the present disclosure, a ratio of a total mass of the silicon nitride powder and the lithium oxide source to a mass of the ball mill medium is 1:1.

In some embodiments of the present disclosure, a ratio of the total mass of the silicon nitride powder and the lithium oxide source to a mass of a mill ball is in a range of 1:(2-3), preferably 1:2.

In some embodiments of the present disclosure, the mill ball is one selected from the group consisting of a silicon nitride mill ball, an aluminium oxide mill ball, and an agate mill ball.

In some embodiments of the present disclosure, the wet-ball milling mixing is performed in a planetary ball mill.

In some embodiments of the present disclosure, the wet-ball milling mixing is performed at a rotational speed of 150-300 rpm, preferably 150 rpm-200 rpm.

In some embodiments of the present disclosure, the wet-ball milling mixing is performed for 2-10 h, preferably 2 h-4 h.

In the present disclosure, after obtaining the mixture, the mixture is placed into a mold and sintered under a protective gas atmosphere to obtain the silicon nitride ceramic sintered body.

In some embodiments of the present disclosure, the method further comprises before placing into a mold and sintering, drying the mixture. In some embodiments of the present disclosure, the drying is performed by spray drying or oven drying.

In some embodiments of the present disclosure, the drying is performed at a temperature of 40° C.-100° C., preferably 40° C.-60° C.

In some embodiments of the present disclosure, the drying is performed under heat preservation for 2-12 h, preferably 4 h-8 h.

There are no specific limitations on the specific implementation process of spray drying.

In some embodiments of the present disclosure, the mixture is granulated by drying. In some embodiments of the present disclosure, when the drying is performed by spray drying, a mixed powder is obtained directly after spray drying.

In some embodiments of the present disclosure, when the drying is performed by oven drying, the material obtained by oven drying is sieved to obtain a mixed power. In some embodiments of the present disclosure, the sieving is performed with a sieve having a sieve diameter of 60-200 meshes, preferably 60 meshes, 80 meshes, 200 meshes, or 100 meshes.

In some embodiments of the present disclosure, the sintering is performed at a temperature of 1350-1800° C., preferably 1400-1750° C.

In some embodiments of the present disclosure, the sintering is performed at a pressure of 10-80 MPa, preferably 15-75 MPa.

In some embodiments of the present disclosure, the sintering is performed under heat preservation and pressure preservation for 0.5-5 h, preferably 0.6 h-4.5 h.

In some embodiments of the present disclosure, the sintering is performed by hot-pressed sintering or spark plasma sintering.

In some embodiments of the present disclosure, the protective gas atmosphere is one selected from the group consisting of a nitrogen atmosphere and an inert gas atmosphere, preferably a nitrogen atmosphere.

To further illustrate the present disclosure, the technical solutions provided by the present disclosure will be described in detail below with reference to examples, but these examples should not be construed as limiting the scope of the present disclosure.

EXAMPLE 1

A high-purity silicon nitride powder (with an average particle size of 5 μm, an oxygen element content of less than 1.6 wt %, and a metallic impurity content of less than 0.2 wt %) was weighed. $Li_2CO_3$ powder was introduced according to the condition that the Li element accounted for 0.3 wt % of a total weight of the silicon nitride powder and the lithium oxide source. The resulting powder was placed into a silicon nitride mill tank. Absolute ethanol was added thereto in a mass ratio of absolute ethanol to the resulting powder being 1:1, and a silicon nitride mill ball was added thereto in a mass ratio of the silicon nitride mill ball to the resulting powder being 1:2, obtaining a mixture. The mixture was ball-milled with a planetary ball mill at a rotational speed of 300 rpm for 4 h. The ball-milled mixture was dried at 60° C. for 4 h and passed through a 60 mesh sieve. The sieved sample was placed into a graphite mold and sintered at a pressure of 40 MPa and a temperature of 1600° C. for 1 h, obtaining a high-purity silicon nitride ceramic sintered body.

EXAMPLE 2

A high-purity silicon nitride powder (with an average particle size of 10 μm, an oxygen element content of less than 1.6 wt %, and a metallic impurity content of less than 0.2 wt %) was weighed. $Li_2O$ powder was introduced according to the condition that the Li element accounted for 0.15 wt % of a total weight of the silicon nitride powder and the lithium oxide source. The resulting powder was placed into a silicon nitride mill tank. Deionized water was added thereto in a mass ratio of deionized water to the resulting powder being 1:1, and an agate mill ball was added thereto in a mass ratio of the agate mill ball to the resulting powder being 1:3, obtaining a mixture. The mixture was ball-milled with a planetary ball mill at a rotational speed of 300 rpm for 2 h. The ball-milled mixture was sprayed and granulated, obtaining a powder. The powder was placed into a graphite mold and subjected to hot-pressed sintering at a pressure of 80 MPa and a temperature of 1700° C. for 5 h, obtaining a high-purity silicon nitride ceramic sintered body.

EXAMPLE 3

A high-purity silicon nitride powder (with an average particle size of 20 μm, an oxygen element content of less than 1.6 wt %, and a metallic impurity content of less than 0.2 wt %) was weighed. $CH_3COOLi$ powder was introduced according to the condition that the Li element accounted for 0.4 wt % of a total weight of the silicon nitride powder and the lithium oxide source. The resulting powder was placed into a silicon nitride mill tank. Absolute ethanol was added thereto in a mass ratio of absolute ethanol to the resulting powder being 1:1, and an agate mill ball was added thereto in a mass ratio of the agate mill ball to the resulting powder being 1:2, obtaining a mixture. The mixture was ball-milled with a planetary ball mill at a rotational speed of 200 rpm for 4 h. The ball-milled mixture was dried at 100° C. for 2 h and passed through a 80 mesh sieve. The sieved sample was placed into a graphite mold and subjected to hot-pressed sintering at a pressure of 10 MPa and a temperature of 1750° C. for 3 h, obtaining a high-purity silicon nitride ceramic sintered body.

EXAMPLE 4

A high-purity silicon nitride powder (with an average particle size of 0.5 μm, an oxygen element content of less than 1.6 wt %, and a metallic impurity content of less than 0.2 wt %) was weighed. $Li_2C_2O_4$ powder was introduced according to the condition that the Li element accounted for 0.5 wt % of a total weight of the silicon nitride powder and the lithium oxide source. The resulting powder was placed into a silicon nitride mill tank. Absolute ethanol was added thereto in a mass ratio of absolute ethanol to the resulting powder being 1:1, and an aluminium oxide mill ball was added thereto in a mass ratio of the aluminium oxide mill ball to the resulting powder being 1:1, obtaining a mixture. The mixture was ball-milled with a planetary ball mill at a rotational speed of 150 rpm for 10 h. The ball-milled mixture was sprayed and granulated, obtaining a powder. The powder was placed into a graphite mold and subjected to hot-pressed sintering at a pressure of 30 MPa and a temperature of 1500° C. for 0.5 h, obtaining a high-purity silicon nitride ceramic sintered body.

EXAMPLE 5

A high-purity silicon nitride powder (with an average particle size of 0.1 μm, an oxygen element content of less than 1.6 wt %, and a metallic impurity content of less than 0.2 wt %) was weighed. $LiOCH(CH_3)_2$ powder was introduced according to the condition that the Li element accounted for 0.6 wt % of a total weight of the silicon nitride powder and the lithium oxide source. The resulting powder was placed into a silicon nitride mill tank. Absolute ethanol was added thereto in a mass ratio of absolute ethanol to the resulting powder being 1:1, and a silicon nitride mill ball was added thereto in a mass ratio of the silicon nitride mill ball to the resulting powder being 1:1, obtaining a mixture. The mixture was ball-milled with a planetary ball mill at a rotational speed of 150 rpm for 10 h. The ball-milled mixture was dried at 40° C. for 12 h and passed through a 40 mesh sieve. The sieved sample was placed into a graphite mold and subjected to hot-pressed sintering at a pressure of 60 MPa and a temperature of 1600° C. for 0.5 h, obtaining a high-purity silicon nitride ceramic sintered body.

EXAMPLE 6

A high-purity silicon nitride powder (with an average particle size of 10 μm, an oxygen element content of less than 1.6 wt %, and a metallic impurity content of less than 0.2 wt %) was weighed. $Li_3PO_4$ powder was introduced according to the condition that the Li element accounted for 0.5 wt % of a total weight of the silicon nitride powder and the lithium oxide source. The resulting powder was placed into a silicon nitride mill tank. Deionized water was added thereto in a mass ratio of deionized water to the resulting powder being 1:1, and a silicon nitride mill ball was added thereto in a mass ratio of the silicon nitride mill ball to the resulting powder being 1:2, obtaining a mixture. The mixture was ball-milled with a planetary ball mill at a rotational speed of 150 rpm for 10 h. The ball-milled mixture was dried at 60° C. for 4 h and passed through a 200 mesh sieve. The sieved sample was placed into a graphite mold and subjected to spark plasma sintering at a pressure of 40 MPa and a temperature of 1400° C. for 1 h, obtaining a high-purity silicon nitride ceramic sintered body.

EXAMPLE 7

A high-purity silicon nitride powder (with an average particle size of 10 μm, an oxygen element content of less than 1.6 wt %, and a metallic impurity content of less than 0.2 wt %) was weighed. $C_2H_5OLi$ powder was introduced according to the condition that the Li element accounted for 0.2 wt % of a total weight of the silicon nitride powder and the lithium oxide source. The resulting powder was placed into a silicon nitride mill tank. Deionized water was added thereto in a mass ratio of deionized water to the resulting powder being 1:1, and a silicon nitride mill ball was added thereto in a mass ratio of the silicon nitride mill ball to the resulting powder being 1:2, obtaining a mixture. The mixture was ball-milled with a planetary ball mill at a rotational speed of 200 rpm for 4 h. The ball-milled mixture was dried at 80° C. for 2 h and passed through a 100 mesh sieve. The sieved sample was placed into a graphite mold and subjected to spark plasma sintering at a pressure of 35 MPa and a temperature of 1500° C. for 0.5 h, obtaining a high-purity silicon nitride ceramic sintered body.

EXAMPLE 8

A high-purity silicon nitride powder (with an average particle size of 10 μm, an oxygen element content of less than 1.6 wt %, and a metallic impurity content of less than 0.2 wt %) was weighed. $LiOCH(CH_3)_2$ powder was introduced according to the condition that the Li element accounted for 0.4 wt % of a total weight of the silicon nitride powder and the lithium oxide source. The resulting powder was placed into a silicon nitride mill tank. Deionized water was added thereto in a mass ratio of deionized water to the resulting powder being 1:1, and an aluminium oxide mill ball was added thereto in a mass ratio of the aluminium oxide mill ball to the resulting powder being 1:2, obtaining a mixture. The mixture was ball-milled with a planetary ball mill at a rotational speed of 300 rpm for 4 h. The ball-milled mixture was dried at 50° C. for 4 h and passed through a 80 mesh sieve. The sieved sample was placed into a graphite mold and subjected to hot-pressed sintering at a pressure of 40 MPa and a temperature of 1550° C. for 1 h, obtaining a high-purity silicon nitride ceramic sintered body.

EXAMPLE 9

A high-purity silicon nitride powder (with an average particle size: 10 μm, an oxygen element content of less than 1.6 wt %, and a metallic impurity content of less than 0.2 wt %) was weighed. A mixed powder of $LiOCH(CH_3)_2$ and $Li_2O$ was introduced according to the condition that the Li element accounted for 0.3 wt % of a total weight of the silicon nitride powder and the lithium oxide source. The resulting powder was placed into a silicon nitride mill tank. Deionized water was added thereto in a mass ratio of deionized water to the resulting powder being 1:1.2, and an aluminium oxide mill ball was added thereto in a mass ratio of the aluminium oxide mill ball to the resulting powder being 1:2, obtaining a mixture. The mixture was ball-milled with a planetary ball mill at a rotational speed of 200 rpm for 4 h. The ball-milled mixture was dried at 60° C. for 4 h and passed through a 100 mesh sieve. The sieved sample was placed into a graphite mold and subjected to hot-pressed sintering at a pressure of 20 MPa and a temperature of 1600° C. for 2 h, obtaining a high-purity silicon nitride ceramic sintered body.

EXAMPLE 10

A high-purity silicon nitride powder (with an average particle size of 5 μm, an oxygen element content of less than 1.6 wt %, and a metallic impurity content of less than 0.2 wt %) was weighed. A mixed powder of $LiOCH(CH_3)_2$, $Li_2O$ and $C_2H_5OLi$ was introduced according to the condition that the Li element accounted for 0.4 wt % of a total weight of the silicon nitride powder and the lithium oxide source. The resulting powder was placed into a silicon nitride mill tank. Deionized water was added thereto in a mass ratio of deionized water to the resulting powder being 1:1, and an aluminium oxide mill ball was added thereto in a mass ratio of the aluminium oxide mill ball to the resulting powder being 1:2, obtaining a mixture. The mixture was ball-milled with a planetary ball mill at a rotational speed of 300 rpm for 4 h. The ball-milled mixture was dried at 60° C. for 6 h and passed through a 100 mesh sieve. The sieved sample was placed into a graphite mold and subjected to hot-pressed sintering at a pressure of 50 MPa and a temperature of 1800° C. for 0.5 h, obtaining a high-purity silicon nitride ceramic sintered body.

COMPARATIVE EXAMPLE 1

A high-purity silicon nitride powder (with an average particle size of 5 μm, an oxygen element content of less than 1.6 wt %, and a metallic impurity content of less than 0.2 wt %) was weighed, and placed into a silicon nitride mill tank. Absolute ethanol was added thereto in a mass ratio of absolute ethanol to the high-purity silicon nitride powder being 1:1, and a silicon nitride mill ball was added thereto in a mass ratio of the silicon nitride mill ball to the high-purity silicon nitride powder being 1:2, obtaining a mixture. The mixture was ball-milled with a planetary ball mill at a rotational speed of 300 rpm for 4 h. The ball-milled, obtaining a mixture. The mixture was dried at 60° C. for 4 h and passed through a 60 mesh sieve. The sieved sample was placed into a graphite mold and sintered at a pressure of 40 MPa and a temperature of 1600° C. for 1 h, obtaining a high-purity silicon nitride ceramic sintered body.

COMPARATIVE EXAMPLE 2

A high-purity silicon nitride powder (with an average particle size of 5 μm, an oxygen element content of less than 1.6 wt %, and a metallic impurity content of less than 0.2 wt %) was weighed. 2 wt % $Al_2O_3$ and 3 wt % $Y_2O_3$ were added as sintering aids. The resulting powder was placed into a silicon nitride mill tank. Absolute ethanol was added thereto in a mass ratio of absolute ethanol to the resulting powder being 1:1, and a silicon nitride mill ball was added thereto in a mass ratio of the silicon nitride mill ball to the resulting powder being 1:2, obtaining a mixture. The mixture was ball-milled with a planetary ball mill at a rotational speed of 300 rpm for 4 h. The ball-milled mixture was dried at 60° C. for 4 h and passed through a 60 mesh sieve. The sieved sample was placed into a graphite mold and sintered at a pressure of 40 MPa and a temperature of 1600° C. for 1 h, obtaining a high-purity silicon nitride ceramic sintered body.

Test Example

The samples prepared in Examples 1-10 and Comparative Examples 1-2 were processed and tested for densification by Archimedes drainage method. The relative densities of the samples prepared in Examples 1-10 are 99.8%, 99.1%, 99.7%, 99.5%, 99.6%, 99.7%, 99.2%, 99.4%, 99.9%, and 99.7%, respectively. The results of their phase composition by X-ray diffraction show that they are all the silicon nitride phase. The metallic impurity content of the samples was analyzed by X-ray fluorescence. The results show that the metallic impurity contents of all the samples prepared in Examples 1-10 are lower than 0.1 wt %. The oxygen content of the samples was analyzed by an oxygen-nitrogen analyzer. The results show that the oxygen contents of all the samples prepared in Examples 1-10 are lower than 1.8 wt %. The relative density of Comparative Example 1 is only 70%. Comparative Example 2 has a relative density of 99% but has a higher content of impurities, a test result of the oxygen content of 3.4 wt %, and test values of metallic impurities such as Al and Y of about 2.1 wt %.

The strength of the samples prepared in the Comparative Examples and Examples was tested at different temperatures to detect the temperature transition point where the strength reduced by 50% of that at room temperature. The bending strength of the samples prepared in Examples 1-10 may be durable to 1500° C. and maintains more than 80%. The sample prepared in Comparative Example 1 has a very low bending strength because the densification is achieved. Even though the sample prepared in Comparative Example 2 is compacted, the bending strength has reduced by more than 50% at 1200° C. Partial data are shown in Table 1.

Table 1 Data of high-temperature strength of Example 1 and Comparative Examples 1-2 (expressed in MPa)

| Serial number | Room temperature | 500° C. | 1000° C. | 1200° C. | 1300° C. | 1400° C. | 1500° C. |
|---|---|---|---|---|---|---|---|
| Example 1 | 907 | 930 | 912 | 886 | 843 | 846 | 786 |
| Comparative Example 1 | 173 | 132 | 137 | 126 | 111 | 131 | 108 |
| Comparative Example 2 | 910 | 920 | 810 | 379 | 221 | 203 | 98 |

The data of high-temperature strength of Examples 2-10 are similar to those of Example 1.

Although the present disclosure is described in detail with reference to the above embodiments, they are only a part of the present disclosure, but not all of them. Other embodiments can be obtained based on these embodiments without creative efforts, and all of these embodiments shall fall within the protection scope of the present disclosure.

What is claimed is:

1. A silicon nitride ceramic sintered body, wherein the silicon nitride ceramic sintered body has a content of a silicon nitride crystalline phase of not less than 98 wt %, a relative density of not less than 99%, a porosity of not larger than 1%, a grain boundary phase comprising Li, 0, N, and Si elements, and a total content of C, F, Al, Mg, K, Ca, Na and rare-earth metals elements of less than 0.1 wt %.

2. The silicon nitride ceramic sintered body of claim 1, wherein the silicon nitride ceramic sintered body has a total content of Li, O, N and Si elements of 99.7-100 wt %.

3. The silicon nitride ceramic sintered body of claim 1, wherein the silicon nitride ceramic sintered body has a content of Li element of 0.15-0.6 wt %.

4. The silicon nitride ceramic sintered body of claim 1, wherein the silicon nitride ceramic sintered body has a content of 0 element of less than 2 wt %.

5. The silicon nitride ceramic sintered body of claim 1, wherein the silicon nitride crystalline phase in the silicon nitride ceramic sintered body has a particle size of 0.3-20 μm.

6. A method for preparing the silicon nitride ceramic sintered body of claim 1, comprising:
   mixing a silicon nitride powder with a lithium oxide source to obtain a mixture; and
   placing the mixture into a mold and sintering under a protective gas atmosphere to obtain the silicon nitride ceramic sintered body,
   wherein the lithium oxide source comprises one or more selected from the group consisting of $Li_2O$, $Li_2CO_3$, $CH_3COOLi$, $Li_2C_2O_4$, $C_2H_5OLi$, $CH_3OLi$, $LiOCH(CH_3)_2$, $CHLiO_2$, $C_6H_5Li$, and $C_4H_9Li$.

7. The method of claim 6, wherein a content of Li element in the lithium oxide source accounts for 0.15-0.7 wt % of a content of the mixture.

8. The method of claim 6, wherein the sintering is performed by hot-pressed sintering or spark plasma sintering; and the sintering is performed at a temperature of 1,350-1,800° C. and a pressure of 10-80 MPa for 0.5-5 h.

9. The method of claim 6, wherein the silicon nitride powder has a particle size of 0.01-20 μm, a content of 0 element of not larger than 1.6 wt %, and a content of metallic impurities of not larger than 0.2 wt %.

10. The method of claim 6, wherein the mixing is performed by wet-ball milling mixing; a ball mill medium of the wet-ball milling mixing comprises one selected from the group consisting of ethanol and water; a ratio of a total mass of the silicon nitride powder and the lithium oxide source to a mass of the ball mill medium is 1:1; a ratio of the total mass of the silicon nitride powder and the lithium oxide source to a mass of a mill ball is in a range of 1:(2-3); and the wet-ball milling mixing is performed at a rotational speed of 150-300 rpm for 2-10 h.

11. The silicon nitride ceramic sintered body of claim 3, wherein the silicon nitride ceramic sintered body has a content of O element of less than 2 wt %.

12. The method of claim 6, wherein the silicon nitride ceramic sintered body has a total content of Li, O, N and Si elements of 99.7-100 wt %.

13. The method of claim 6, wherein the silicon nitride ceramic sintered body has a content of Li element of 0.15-0.6 wt %.

14. The method of claim 6, wherein the silicon nitride ceramic sintered body has a content of O element of less than 2 wt %.

15. The method of claim 6, wherein the silicon nitride crystalline phase in the silicon nitride ceramic sintered body has a particle size of 0.3-20 μm.

\* \* \* \* \*